United States Patent
Goto et al.

(10) Patent No.: US 8,088,254 B2
(45) Date of Patent: *Jan. 3, 2012

(54) METHODS FOR PRODUCING RECYCLED PULP, METHODS FOR MODIFYING PULP FIBER SURFACES AND DIRTS, AS WELL AS PULP PROCESSING EQUIPMENTS

(75) Inventors: Shisei Goto, Tokyo (JP); Keigo Watanabe, Tokyl (JP); Hiromichi Tsuji, Tokyo (JP); Takanori Miyanishi, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/708,585

(22) Filed: Feb. 19, 2010

(65) Prior Publication Data
US 2010/0147479 A1    Jun. 17, 2010

Related U.S. Application Data

(63) Continuation of application No. 10/566,262, filed as application No. PCT/JP2004/011062 on Aug. 2, 2004, now Pat. No. 7,727,355.

(30) Foreign Application Priority Data
Jul. 31, 2003   (JP) .................................. 2003-283957

(51) Int. Cl.
*D21B 1/32* (2006.01)
*D21B 1/36* (2006.01)

(52) U.S. Cl. ................. 162/261; 162/4; 162/52; 162/57
(58) Field of Classification Search ............... 162/4, 57, 162/189, 252
See application file for complete search history.

(56) References Cited

U.S. PATENT DOCUMENTS

| | | | | |
|---|---|---|---|---|
| 4,872,953 A | * | 10/1989 | Smith | 162/261 |
| 5,393,417 A | * | 2/1995 | Cox | 210/96.1 |
| 6,019,947 A | * | 2/2000 | Kucherov | 422/128 |

OTHER PUBLICATIONS

Smook, Handbook for Pulp and Paper Technologists, 1992, Angus Wilde Publications, 2nd edition, chapter 9.*
Soyoama et al., Improvement of Fatigue strength of Aluminum Alloy by Cavitation shotless Peening, 2002, Journmal of Engineering Materials and Technology, vol. 124, p. 135-139.*

* cited by examiner

*Primary Examiner* — Matthew Daniels
*Assistant Examiner* — Anthony Calandra
(74) *Attorney, Agent, or Firm* — Roylance, Abrams, Berdo & Goodman, L.L.P.

(57) ABSTRACT

Pulp processing equipment used to produce high-quality recycled pulp with little damage to fibers, high brightness and low residual ink by means of a force selectively acting on fiber surfaces during the process of recycling waste paper is disclosed. Moreover, fiber surfaces are modified by means of a force acting on only the fiber surfaces to obtain high-quality pulp and to render harmless dirts deteriorating pulp quality. A jet system is provided having one or more nozzles for jetting an aqueous slurry containing a material comprising cellulose into a vessel.

13 Claims, 11 Drawing Sheets

Process for producing waste woodfree paper DIP

Process for producing waste newspaper DIP

Process for producing high brightness waste news/magazine paper DIP

Production flow:

Example process flow :

METHODS FOR PRODUCING RECYCLED PULP, METHODS FOR MODIFYING PULP FIBER SURFACES AND DIRTS, AS WELL AS PULP PROCESSING EQUIPMENTS

CROSS-REFERENCE TO RELATED APPLICATION

This application is a continuation application of Ser. No. 10/566,262, filed Jun. 30, 2006, the disclosure of which is hereby incorporated by reference in its entirety.

TECHNICAL FIELD

The present invention relates to methods for producing recycled pulp from waste paper, as well as printing papers, such as coated and uncoated paper made from the pulp produced by such methods. More specifically, the present invention relates to methods for producing a pulp having high brightness and low residual ink by actively introducing cavitation bubbles into a pulp suspension, to strip/fragment contaminants such as ink from pulp fibers and inorganic particles under an impact force induced by collapse of the bubbles during the process of producing recycled pulp from printed waste paper such as newspapers, advertising leaflets, magazines, data recording paper, photocopies, computer printouts, or mixtures of these printed matter such as waste magazine paper and waste office paper.

A second aspect of the present invention relates to methods for modifying and improving a quality of pulp by utilizing the impact force induced by collapse of cavitation bubbles actively introduced into a pulp suspension, as well as pulp processing apparatuses.

Liquid evaporates into bubbles even at normal temperatures, under some conditions in the presence of a pump or propeller because the liquid flow is locally accelerated to cause a pressure drop; this phenomenon is referred to as "cavitation".

The term "deinking" refers to separation of ink from waste paper, and encompasses the concept of ink stripping and complete ink removal.

BACKGROUND ART

Recently, there have been growing demands for recycling waste paper with a view to saving global resources and preserving the environment, and increasing the range of application of recycling has become an important issue. While conventional recycled pulp has generally been used for newsprint/magazine paper etc., a demand has grown recently for the production of recycled pulp having high brightness and low residual ink; which is to be achieved by advanced treatment of waste paper with a view to expanding a range of application of recycled pulp.

Methods for recycling waste paper typically comprise a step of stripping ink from pulp fibers and a step of removing the stripped ink. More specifically, the mainstream method comprises promoting stripping of ink from pulp fibers and fragmentation thereof by hydrodynamic shear forces or the friction force between pulp fibers in a pulper and subsequently removing ink by flotation and/or washing. During this process, waste paper is typically treated at basic pH by adding deinking chemicals such as sodium hydroxide, sodium silicate, oxidizing bleaches and/or reducing bleaches and deinking agents, if needed. Advanced treatment methods for waste paper include, for example, promoting stripping/fragmentation of ink by mechanical force after the ink stripping step or ink removal step or removing ink again and then (patent document 1) stripping ink that could not be removed by the previous treatment and remains on pulp fibers.

However, diversification of waste paper has led to increased inclusion of offset inks deteriorated over time to an advanced stage of oxidative polymerization, toner inks thermally fused to pulp fibers, UV-curable resin inks cured by treatment during printing, etc., which cause the problem of insufficient stripping of ink during recycling that results in a significant impairment in the final pulp quality due to the presence of unstripped ink in the paper pulp. This problem has been addressed by treatment under higher mechanical load or at higher temperatures or by adding larger amounts of chemicals such as alkalis or deinking agents, but the increased mechanical load caused problems such as fragmentation of pulp fibers or increase of small fibers or twisting of pulp fibers resulting in a loss of paper strength or size stability or paper curling; and the increase of steam costs for high temperatures or chemical costs caused problems of increased costs. Another approach is to repeat multiple cycles of step of stripping ink by mechanical force and the step of removing ink by flotation and/or washing until a desired pulp quality is obtained, but this approach requires a very large capital investment and invites an increase in drainage load so that it is considerably disadvantageous from the aspects of cost, energy and environmental conservation and has not been widely used. Thus, especially toner prints and UV-curable resin ink prints have been used for only paperboards and household paper, but have not been positively used as raw waste paper materials for printing paper, specialty paper for communication and newsprint paper.

Moreover, improvements in the utilization rate of waste paper has enabled pulp fibers per se to be recycled a greater number of times, and with repeated recycling pulp fibers are more severely damaged as reported by Okayama et al. (Takayuki Okayama, The 7th Basic Lecture about Pulp, Waste Paper Pulp (Part 2), Edited by Japan Technical Association of the Pulp and Paper Industry, p101-111, 2002). It is known that the hydrogen bonding capability of pulp fibers considerably decreases by heat drying, and when waste paper once dried is to be recycled, the hydrogen bonding capability must be improved by beating the waste paper with a refiner or the like to raise pulp fibers in order to compensate for the decrease in hydrogen bonding capability. However, the inner structures of pulp fibers are seriously damaged and turn into structures having lamellar or annular cracks during this process. Pulp fibers in such a state seem to be readily broken by friction between fibers due to mechanical force or contact with agitating blades during the process of recycling waste paper, thereby promoting fragmentation of pulp fibers. Thus, conventional techniques can not avoid damage to pulp fibers or an increase in costs such as energy consumption or drainage costs in order to produce high-quality pulp from diversifying waste papers.

Pulp fibers have conventionally been modified by beating pulp using a mechanical force to fibrillate pulp fibers so that the bonding area between fibers is enlarged by raising microfibrils on fiber surfaces to improve bonding strength. However, such a method deteriorates paper strength because of a decrease in fiber length resulting from cutting of pulp fibers per se.

Ink stripping performance has conventionally been improved by causing friction between pulp fibers under mechanical load such as kneaders and surface chemical action by surfactants called deinking agents. However, hard-to-strip toners and UV-curable resin inks are being used increasingly in recent years, which causes damage to pulp fibers per se due to the increased mechanical load.

For bleaching kraft pulp, chlorine bleaches have been used to decompose and remove organic coloring components derived from lignin or the like, but they are being replaced by bleaching without using chlorine or bleaching without using even chlorine bleaches because of the environmental impact of bleach wastewater, which causes problems of increased costs due to the decreased bleaching efficiency.

Thus, conventional techniques could not avoid damage to pulp fibers or cost increases such as chemical costs because of the mechanical load imposed on the entire pulp fibers in order to improve pulp quality.

The following Ukrainian non-patent documents use cavitation for producing waste paperboard pulp, but do not include deinking treatment.

Patent document 2 discloses a method for treating pulp via cavitation by passing a pulp suspension through a reactor having a special shape, but it was difficult to fully strip/remove ink by this method.

REFERENCES

Patent Document 1: Japanese Patent No. 3191828.
Patent Document 2: JPA SHO-49-51703.
Non-Patent Document 1: R. A. SoloVitsyV et al., Bum Prom-st', 1987 (6), 22.
Non-Patent Document 2: R. A. SoloVitsyV et al., Bum Prom-st', 1987 (1), 25.
Non-Patent Document 3: R. A. SoloVitsyV et al., Bum Prom-st', 1986 (7), 24.

DISCLOSURE OF THE INVENTION

Problems to be Solved by the Invention

Thus, the present invention aims to provide methods for producing high-quality recycled pulp with little damage to pulp fibers, high brightness and low residual ink by means of a force selectively acting on pulp fiber surfaces to strip ink during the process of recycling waste paper. The present invention also aims to provide pulp produced by the methods described above as well as, coated and uncoated paper made from such pulp.

A second aspect of the present invention aims to provide methods for modifying pulp fiber surfaces by means of a force acting on only the pulp fiber surfaces to obtain high-quality pulp and to render harmless dirts which deteriorate pulp quality; and pulp processing equipments.

Means for Solving the Problems

Noting that most inks are deposited on the surfaces of pulp fibers and/or coated layers, we closely studied methods for stripping ink by selectively applying a load on pulp fiber surfaces rather than the conventional method for stripping ink by applying a load on overall pulp fibers, and as a result, we accomplished the present invention on the basis of the finding that high-quality pulp with high brightness and low residual ink can be obtained by promoting stripping/fragmentation of ink deposited on pulp fiber surfaces while preventing damage to pulp fibers per se. Accordingly, the present invention lies in actively introducing bubbles generated by cavitation into a pulp suspension to strip/fragment contaminants such as ink deposited on pulp fibers and inorganic particles by means of the impact force induced by collapse of the fine bubbles during the process of recycling waste paper.

Accordingly, the present invention provides a method for producing recycled pulp characterized in that bubbles are generated by cavitation and contacted with a pulp suspension to strip a contaminant deposited on pulp fibers and inorganic particles during the process of recycling waste paper.

According to this aspect of the present invention, cavitation can be generated by means of a fluid jet, and the pulp suspension and bubbles can be contacted by emitting the pulp suspension as a fluid jet. The fluid jet can be a liquid jet, and the contaminant can be ink. The fluid forming the jet can be any of liquids, gases and solids such as powder or pulp or a mixture thereof so far as it is in the fluid state. If necessary, the fluid can be combined with another fluid as a fresh fluid. The fluid and the fresh fluid may be jetted as a homogeneous mixture or separately jetted.

The liquid jet means a jet of a liquid or a fluid containing solid particles or a gas dispersed or mixed in a liquid, including a jet of pulp or a slurry of inorganic particles or a liquid containing bubbles. The gas here may include bubbles generated by cavitation.

The present invention also provides a method for producing recycled pulp characterized in that bubbles are generated by cavitation and contacted with a pulp suspension to strip and separate a contaminant deposited on pulp fibers and inorganic particles during any one or more steps of the process of recycling waste paper comprising the step of stripping ink by cavitation and the subsequent step of removing ink by flotation and/or washing. The process of recycling waste paper here may be a deinking process.

Cavitation generates a high impact pressure reaching several GPas in a local region on the order of several micrometers when cavitation bubbles collapse and microscopically it raises the temperature up to several thousand degrees centigrade by adiabatic compression during collapse of bubbles, as described in a book of Katoh (New Edition Cavitation: Basics and Recent Advance, Written and Edited by Yoji Katoh, Published by Makishoten, 1999). As a result, the temperature rises when cavitation occurs. For these reasons, cavitation has harmful influences such as damage, oscillation and performance loss on fluid machinery and this aspect has been recognized as a technical problem to be solved. Recently, rapid advances in researches on cavitation made it possible to precisely control the region in which cavitation occurs and even the impact force by using hydrodynamic parameters of cavitation jet as operation factors. As a result, expectations are arising for effective utilization of the strong energy of cavitation by controlling the impact force induced by collapse of bubbles. Thus, it became possible to precisely control cavitation by operation/adjustment based on hydrodynamic parameters. This shows that stability of technical effects can be maintained, and the present invention is characterized by actively introducing bubbles generated by controlled cavitation into a pulp suspension to effectively utilize its energy rather than the conventional uncontrollably harmful cavitation spontaneously generated in fluid machinery.

The reason why a local load is introduced into pulp fiber surfaces and ink is stripped in the present invention may be explained as follows. When fine bubbles generated by cavitation collapse, a strong energy is produced at a local region on the order of several micrometers, as described above. Thus, when fine bubbles or bubble clouds collapse at or near pulp fiber surfaces, the impact force arrives at the pulp fiber surfaces directly or via liquid and becomes absorbed into an amorphous region of cellulose forming pulp fibers, thereby promoting external fibrillation and swelling of pulp fibers and at the same time stripping contaminants such as ink deposited on the pulp fiber surfaces. The bubbles are very small relative to pulp fibers so that the impact force is not so strong as to damage the entire pulp fibers. Moreover, pulp fibers absorb excessive energy as kinetic energy of the fibers per se even if a very strong impact force is induced by continuous collapse of bubble clouds because they are dispersed in liquid but not fixed. Thus, it is thought that the methods of the present invention can reduce damages such as fragmentation of pulp fibers as compared with stripping ink by mechanical action.

JPB HEI-7-18109 proposes a deinking method using the shock caused by expansion/contraction of bubbles generated by shock waves induced from ultrasonic waves radiated into a vessel via a base plate of a deinking equipment from an ultrasonic generator placed at the bottom of the base plate. Generally, when an ultrasonic transducer is used in an open system, high-quality pulp as intended by the present invention cannot be obtained because cavitation occurs with low efficiency.

Known separation means relying on bubbles during the process of recycling waste paper include flotators and pressure flotation equipment as summarized by Doshi et al. (M. R. Doshi and J. M. Dyer, "Paper Recycling Challenge Vol. II-Deinking and Bleaching", pp 3, Doshi & Associates Inc., 1997). Flotators are designed for selective foam separation of ink from a mixture of fibers and ink, while pressure flotation equipments are designed to separate substances suspended in water by fine bubbles. Thus, these techniques are essentially different from the present invention in the action region or mechanism and purposes because such known means are intended to separate already dispersed substances and lack stripping/dispersing function and require stable robust foams to which substances adhere to float so that they are separated as foam layers.

We also closely studied methods for selectively modifying pulp fiber surfaces, and as a result, we accomplished the second aspect of the present invention on the basis of the finding that hydrophilization of pulp fiber surfaces, fibrillation of pulp fibers, stripping of hydrophobic substances and decomposition of organic coloring components can be promoted to give high-quality pulp and simultaneously render harmless dirts, deteriorating pulp quality, by actively introducing fine bubbles into a pulp suspension without damaging pulp fibers per se by the impact force induced by collapse of fine bubbles (cavitation bubbles).

The collapse pressure of cavitation means pressure variation in liquid occurring when cavitation bubbles collapse, and normally means pressure oscillation in a wide wavelength range from audible sounds to ultrasounds.

The expression "without damaging pulp fibers per se by the impact force induced by collapse of cavitation bubbles" in the second aspect of the present invention means that single fibers are less liable to breakage, flexion and strength loss as compared with other treatments giving similar effects.

The dirts mean essentially all substances other than pulp cellulose contained in raw waste paper materials, such as ink, fillers, pigments, sticky foreign substances and binder components.

The expression "modifying pulp fiber surfaces and dirts" means alteration of the original properties by for e.g., increasing hydrophilicity to facilitate removal of unremovable dirts or prevent aggregation responsible for deposits such as scales. The deposits here mean deposits or precipitates comprising inorganic substances, organic substances or complexes thereof.

Separation of pulp and dirts is achieved by a method other than cavitation such as flotation, filtration and density separation. Specific separating means include flotators, washers, screens and cleaners. Separation operation can be carried out using a different equipment after stripping by cavitation treatment, or stripping and separation can be continuously carried out in a single equipment by incorporating a cavitation generating mechanism into a separating means.

The reason why only pulp fiber surfaces are modified in the second aspect of the present invention is unknown, but explained as follows, for example. Microscopically, a high impact pressure reaching several GPas is generated in a local region on the order of several micrometers when one fine bubble collapses and the temperature rises up to several thousand degrees centigrade by adiabatic compression during collapse of bubbles. Thus, it is thought that when fine bubbles on the order of 1 μm-0.2 mm collapse on pulp fiber surfaces, the impact force arrives at pulp fiber surfaces via water and becomes absorbed into an amorphous region of cellulose forming pulp fibers, thereby promoting external fibrillation and swelling of pulp fibers and at the same time stripping hydrophobic substances or the like deposited on the pulp fiber surfaces.

In addition, the reason why dirts are rendered harmless is explained as follows. Small organic substances are thermally decomposed or denatured at reaction sites under extreme conditions caused by shock waves when fine bubbles collapse. Coarse foreign objects are thought to be hydrophilized on their surfaces or decomposed by the action of free active radical species such as OH radicals generated from water molecules by high energy under extreme conditions.

ADVANTAGES OF THE INVENTION

The methods for producing pulp according to the present invention make it possible to obtain high-quality pulp and coated and uncoated paper with less damage to pulp fibers, high brightness and little quality loss caused by contaminants by stripping contaminants deposited on fiber surfaces in relation to recycled pulp derived from waste paper.

The methods for producing pulp according to the second aspect of the present invention make it possible to obtain high-quality pulp and coated and uncoated paper with higher strength, high brightness and little quality loss caused by dirts by modifying the surfaces of pulp fibers while preventing damage to pulp fibers per se in relation to wood pulp such as kraft pulp or mechanical pulp and recycled pulp derived from waste paper.

REFERENCES IN THE DRAWINGS

Figure 1:
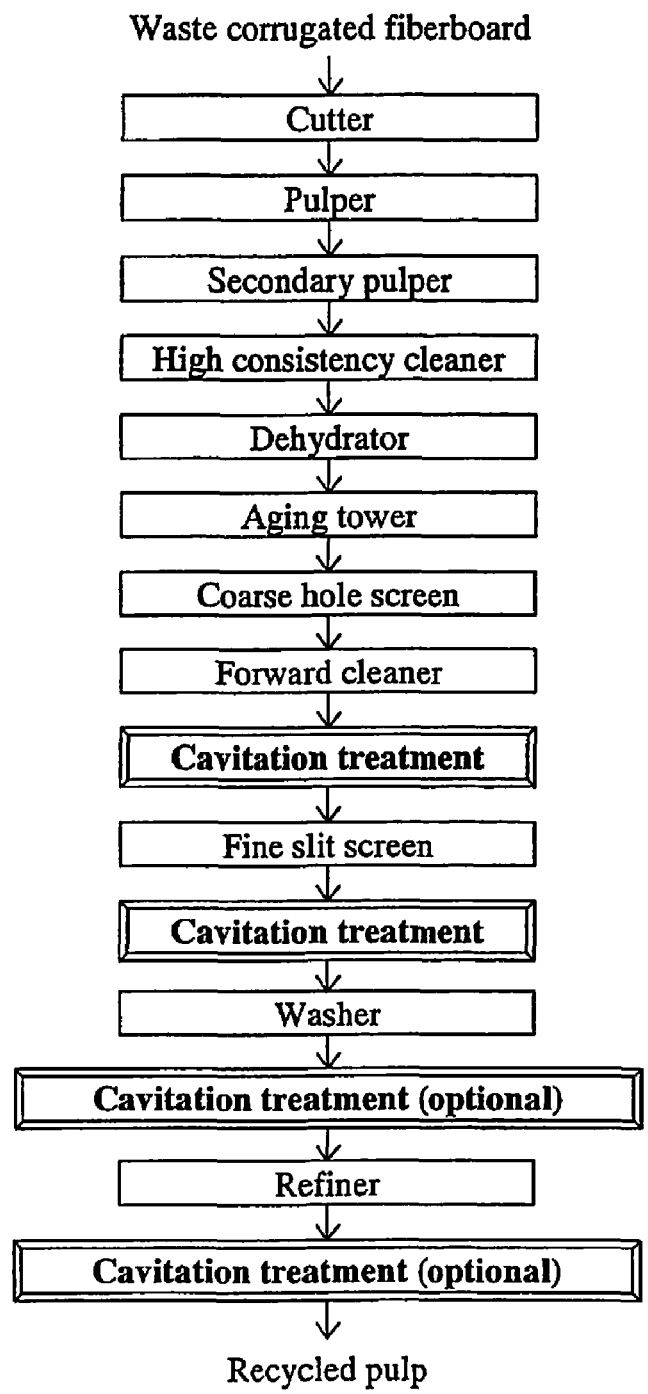
FIG. 1 shows an example of a flow chart of a process in which waste corrugated fiberboard pulp is subjected to the cavitation treatment of the present invention.
Figure 2A:
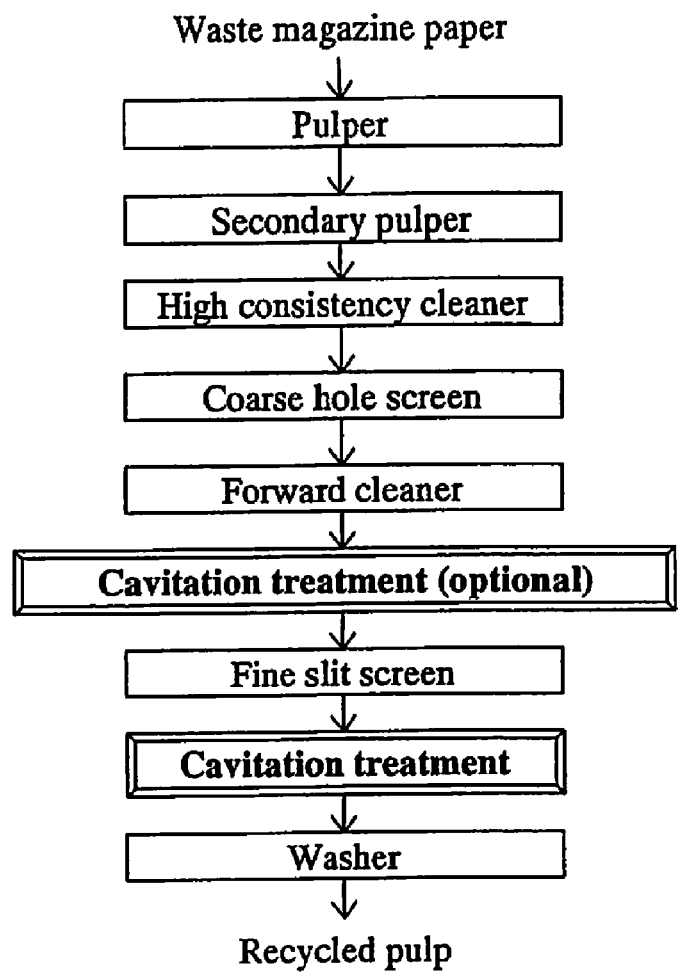
FIG. 2A shows an example of a flow chart of a process in which waste magazine paper pulp is subjected to the cavitation treatment of the present invention.
Figure 2B:
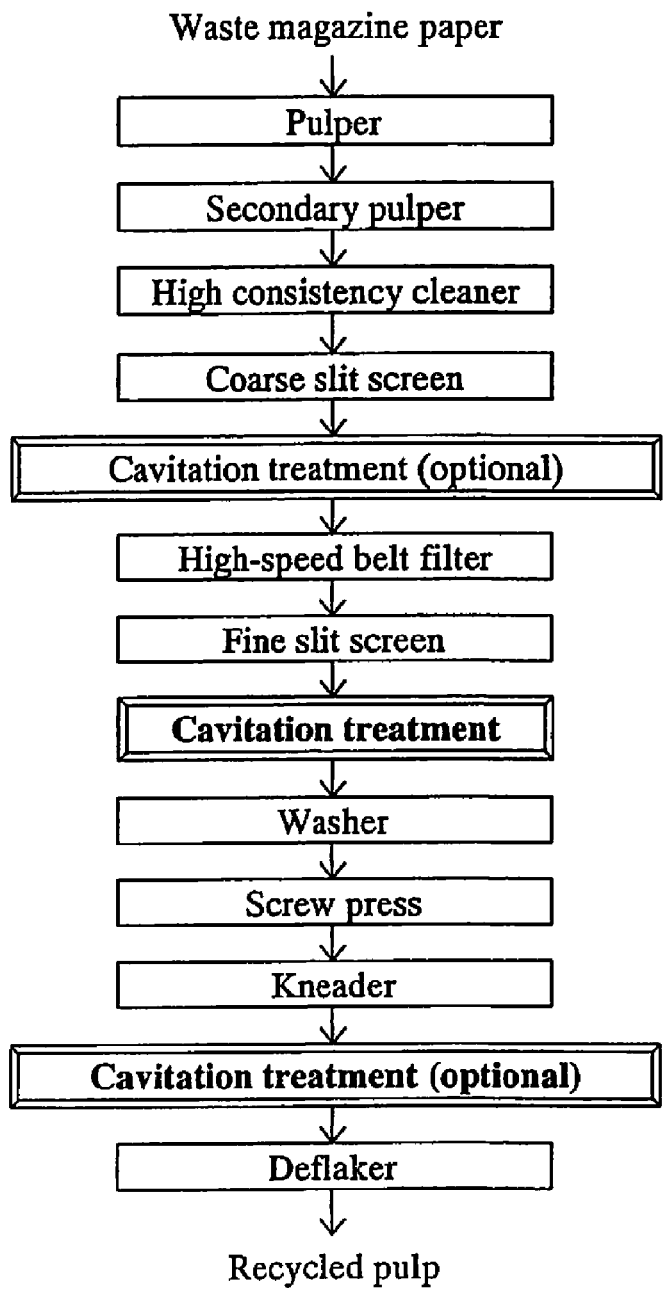
FIG. 2B shows an example of a flow chart of a process in which waste magazine paper pulp is subjected to the cavitation treatment of the present invention.
Figure 3:
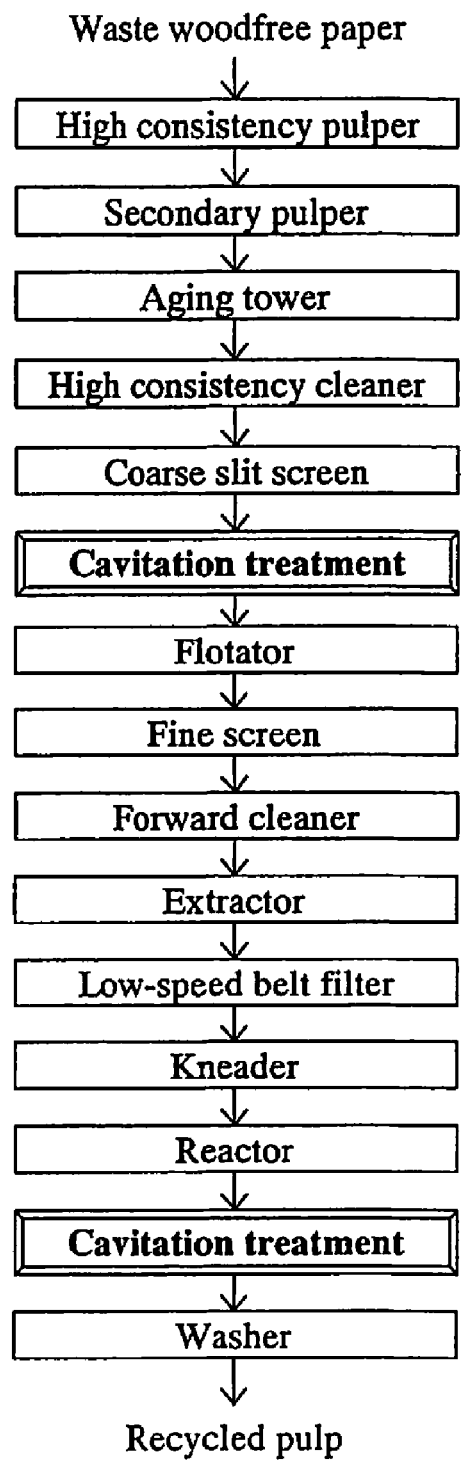
FIG. 3 shows an example of a flow chart of a process in which waste woodfree paper DIP is subjected to the cavitation treatment of the present invention.
Figure 4:
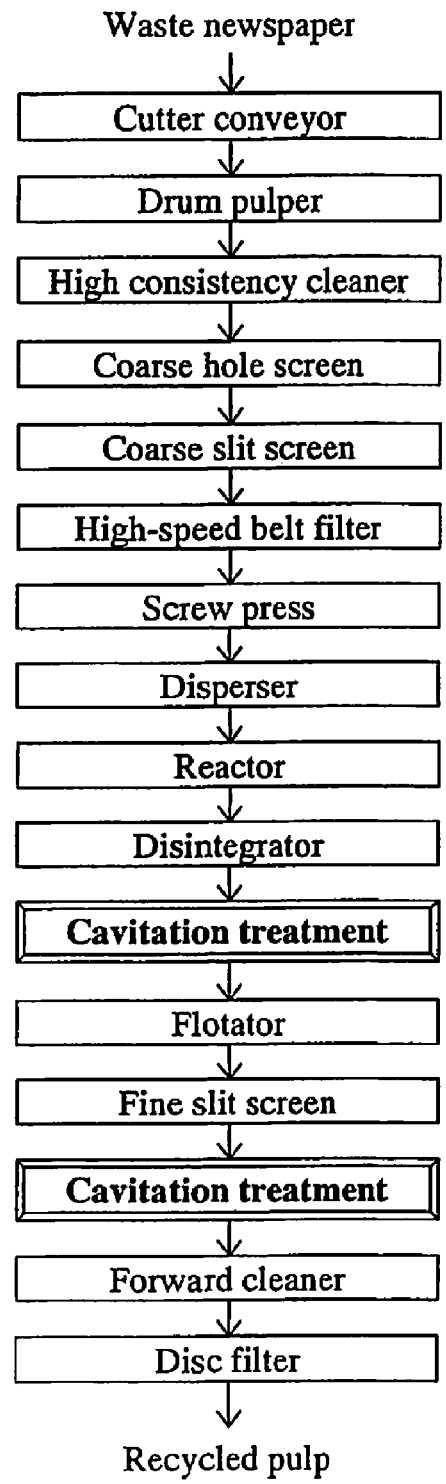
FIG. 4 shows an example of a flow chart of a process in which waste newspaper DIP is subjected to the cavitation treatment of the present invention.
Figure 5:
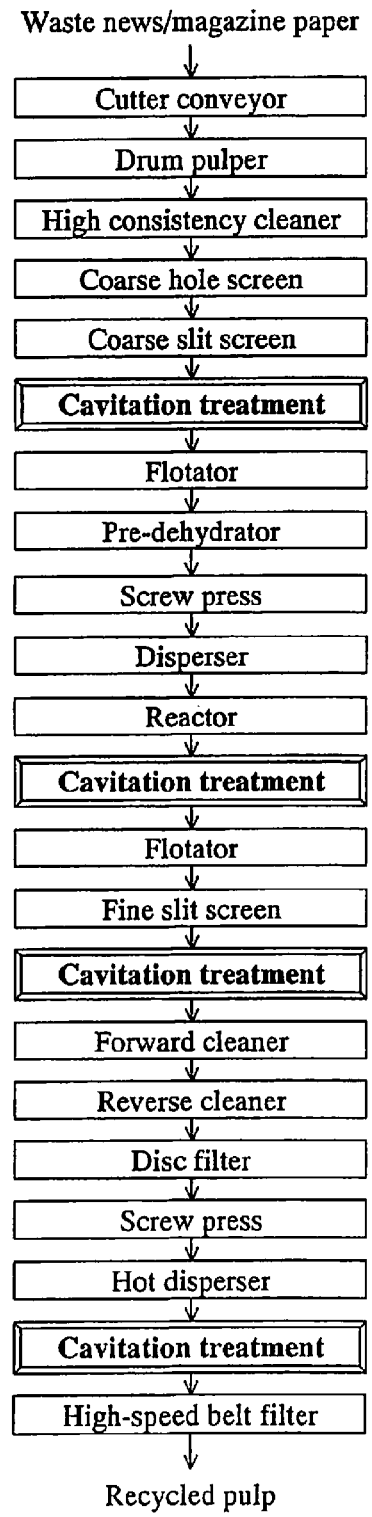
FIG. 5 shows an example of a flow chart of a process in which high brightness waste news/magazine paper DIP (pulp derived from news/magazine paper or the like and showing an ISO brightness of 60% or more when it is in the form of a product pulp) is subjected to the cavitation treatment of the present invention.

1: sample tank
2: nozzle
3: cavitation jet cell
4: plunger pump
5: upstream pressure regulating valve
6: downstream pressure regulating valve
7: upstream pressure meter
8: downstream pressure meter
9: water feed valve
10: circulating valve
11: drain valve
12: temperature sensor
13: mixer

PREFERRED EMBODIMENTS OF THE INVENTION

In cavitation, the flow rate and pressure are especially important because it occurs when a liquid is accelerated and a local pressure becomes lower than the vapor pressure of the liquid. Therefore, the basic dimensionless number expressing a cavitation state, Cavitation Number σ is defined as follows (New Edition Cavitation: Basics and Recent Advance, Written and Edited by Yoji Katoh, Published by Makishoten, 1999).

$$\sigma = \frac{p_\infty - p_v}{\frac{1}{2}\rho U_\infty^2} \quad (1)$$

where $p_\infty$: pressure of normal flow, $U_\infty$: flow rate of normal flow, $p_v$: vapor pressure of fluid, $\rho$: density of fluid.

If the cavitation number here is high, it means that the flow site is under a condition resistant to cavitation. Especially when cavitation is generated through a nozzle or an orifice tube like a cavitation jet, the cavitation number σ can be rewritten by the following equation (2) where $p_1$: nozzle upstream pressure, $p_2$: nozzle downstream pressure, $p_v$: saturated vapor pressure of sample water, and the cavitation number σ in cavitation jet can be approximated as follows because of the large pressure difference between $p_1$, $p_2$ and, $p_v$, resulting in $p_1 \gg p_2 \gg p_v$ (H. Soyama, J. Soc. Mat. Sci. Japan, 47 (4), 381 1998).

$$\sigma = \frac{p_2 - p_v}{p_1 - p_2} \cong \frac{p_2}{p_1} \quad (2)$$

Cavitation conditions in the present invention are as follow: the cavitation number σ defined above is desirably 0.001 or more and 0.5 or less, preferably 0.003 or more and 0.2 or less, especially 0.01 or more and 0.1 or less. If the cavitation number σ is less than 0.001, little benefit is attained because of the small pressure difference against the surroundings when cavitation bubbles collapse, but if it is greater than 0.5, cavitation hardly occurs because of the small pressure difference in the flow.

When a jetting liquid is emitted via a nozzle or an orifice tube to generate cavitation, the pressure of the jetting liquid (upstream pressure) is desirably 0.01 MPa or more and 30 MPa or less, preferably 0.7 MPa or more and 15 MPa or less, especially 2 MPa or more and 10 MPa or less. If the upstream pressure is less than 0.01 MPa, little benefit is attained because of the small pressure difference against downstream pressure. If it is greater than 30 MPa, cost disadvantages occur because special pump and pressure vessel are required and energy consumption increases.

The jet flow rate of the jetting liquid is desirably in the range of 1 m/sec or more and 200 m/sec or less, preferably in the range of 20 m/sec or more and 100 m/sec or less. If the jet flow rate is less than 1 m/sec, little benefit is attained because the pressure drop is too small to generate cavitation. If it is greater than 200 m/sec, however, cost disadvantages occur because high pressure is required and therefore, a special equipment is required.

The present invention can be applied to raw materials such as newspapers, advertising leaflets, groundwood paper-based magazines, coated paper-based magazines, heat/pressure sensitive paper, simili/woodfree colored paper, photocopying paper, computer output paper or mixed waste paper thereof, and it is especially effective for treating waste newspapers or groundwood paper-based magazines deteriorated over time especially in summer or office waste paper including toner prints simultaneously with or separately from the waste paper described above. Moreover, it is especially effective when the waste paper described above contains prohibited products such as laminated paper or paper printed with UV-curable resin inks. The prohibited products refer to all products belonging to classes A and B defined by Paper Recycling Promotion Center (Waste Paper Handbook edited by Paper Recycling Promotion Center, 1999, p 4). The office waste paper refer to all of the woodfree office waste paper as defined by Paper Recycling Promotion Center (Waste Paper Handbook edited by Paper Recycling Promotion Center, 1999, p 3), but are not limited to them and include any waste paper collected from offices or households. Inks other than toners contained in waste paper include known printing inks ("Handbook of Printing Engineering", Edited by The Japanese Society of Printing Science and Technology, Gihodo Shuppan Co., Ltd., p 606, 1983), non-impact printing inks ("The Latest Specialty Functional Inks", CMC Publishing Co., Ltd., p 1, 1990), etc. Non-heatset offset printing inks drying by penetration used in newspapers and groundwood paper-based magazines include, but are not limited to, known offset printing inks for newspapers and groundwood paper (Tomoyuki Gotoh, Journal of The Japanese Society of Printing Science and Technology, 38 (5), 7, (2001), etc.). The present invention is especially suitable for treating waste paper printed with multiple such inks. The proportions between fibers and ash contents are not specifically limited. The present invention can also be applied to waste paper pulp to give higher quality pulp.

The present invention can be applied to any site in the deinking process used to recycle waste paper comprising the step of stripping ink under the action of a mechanical force such as a conventional high consistency pulper and the step of removing ink by flotation and/or washing. It can also be applied to process white water including drainage water produced in the process described above or rejects after flotation or recycled water after washing.

Means for stripping ink by mechanical force include tub or drum pulpers, kneaders, MICA processors, dispersers and various means based on disintegration, kneading and dispersing techniques as shown in the document of Carre et al. (B. Carre, Y. Vernac and G. Galland, Pulp and Paper Canada, 99 (9), 46 (1998)). Especially, a greater benefit can be attained by combining a mechanical ink stripper with the present invention because ink is stripped by two different mechanisms. If desired, sodium hydroxide, sodium silicate and other alkaline chemicals, deinking agents, oxidative bleaches and reducing bleaches can also be added. If desired, dyes, fluorescent whitening agents, pH modifiers, antifoaming agents, pitch control agents, slime control agents or the like can also be added without problem. The ink stripper and ink remover or treating conditions used are not specifically limited. The step of removing foreign substances or a bleaching step commonly used in the deinking process described above can be incorporated if it is necessary to remove foreign substances or to achieve high brightness.

Means for generating cavitation in the present invention include, but are not limited to, using a liquid jet, an ultrasonic transducer, a combination of an ultrasonic transducer and a horn amplifier, and laser irradiation. Preferably, the use of a liquid jet is very effective against contaminants such as inks because cavitation bubbles are generated with high efficiency and cavitation bubble clouds having a stronger impact force of collapse are formed. The cavitation generated by these methods is clearly different from the uncontrollably harmful cavitation spontaneously generated in conventional fluid machinery.

As used herein, the pulp fibers refer to fibrous materials derived from the waste paper described above, such as cellulose fibers of chemical pulp or mechanical pulp or waste paper pulp. The present invention can also be applied to chemical fibers or glass fibers other than pulp fibers. The inorganic particles refer to materials remaining as ash after incineration of paper, such as fillers internally added during papermaking or pigments used for coating. Examples include, but are not limited to, calcium carbonate, talc, kaolin, and titanium dioxide. The contaminants refer to foreign substances deposited on pulp fibers or fillers or pigments and include the inks as described above as well as coated layer residues such as fluorescent dyes or common dyes, coating colors, starches and polymers; processed layer residues such as laminates; adhesives and self-adhesives, sizing agents, etc. Other examples include, but are not limited to, papermaking internal auxiliaries used during papermaking such as yield improvers, freeness improvers, paper strength enhancers and internal sizing agents.

In the method for generating cavitation by a fluid (liquid) jet in the present invention, the liquids that can be jetted to the pulp suspension include, but are not limited to, distilled water, tap water, industrial water, reused water, pulp drainage water, white water, pulp suspensions, alcohol recycled during the papermaking process. Preferably, the pulp suspension itself is jetted to provide a greater benefit because not only cavitation is generated around the jet but also the hydrodynamic shear force caused by emitting the jet under high pressure from an orifice has the effect of stripping contaminants. Moreover, the shear forces applied from pumps or pipes also have a stripping effect.

The site where cavitation is generated in the present invention can be selected from, but is not limited to, the inside of any vessel such as a tank or the inside of a pipe. The treatment can be a one-pass operation, but the stripping effect can be further enhanced by repeating a necessary number of cycles. The treatment can be performed in parallel or in series using multiple generating means. The solids content of the target pulp suspension in which cavitation is to be generated is preferably 3% by weight or less, more preferably 0.1-1.5% by weight in respect of the bubble generating efficiency. When the solids content of the target liquid is higher than 3% by weight and lower than 40% by weight, a benefit can be attained by adjusting the consistency of the jetting liquid to 3% or less. The pH of the target liquid is desirably basic because pulp fibers are highly swollen, stripped contaminants are less liable to be redeposited and more OH active radicals are produced.

The present invention is effective for stripping/fragmentation of dirts at relatively low consistency and low temperatures that would be difficult by conventional deinking techniques. Thus, high-quality pulp can be produced without excessively dehydrating pulp to high consistency by using the present technique.

Low consistency pulpers are known as ink strippers at low consistency used in conventional deinking techniques, but their ink stripping ability is much lower than those of high consistency pulpers or kneaders or dispersers at high pulp consistency. For efficient fragmentation of dirts in kneaders or dispersers, it is necessary to use a high pulp consistency of at least 25% by weight or more or about 30% by weight. In addition, the treating temperature is normally 50° C. or more. However, a large amount of energy is required to dehydrate pulp especially at a solids content of about 1% by weight after flotation to about 30% by weight because multiple dehydrators are required.

In contrast, the present invention allows reduction of equipment and energy for dehydration because pulp after flotation can be directly treated without adjusting the consistency and ink and dirts can be stripped/fragmented with an efficiency comparable to those of kneaders. Moreover, conventional techniques require a large amount of steam to heat pulp, but pulp may not always be heated in the present invention, whereby steam energy can be reduced. Circulating water for use in the process may be separated by partial dehydration and then diluted with another type of water and used without problems.

According to the present invention, ink can be stripped from pulp fibers without using deinking chemicals. In mechanical ink stripping means used in conventional deinking process such as kneaders, brightness is not improved even if the residual ink amount decreases because pulp fibers are rubbed together at high consistency so that ink is rubbed into the pulp fibers as soon as the ink is stripped, in contrast to which pulp with high brightness can be obtained by the methods of the present invention because stripping/dispersion of ink at low consistency is promoted so that it is hardly rubbed into pulp fibers.

As used herein, the jetting liquid refers to a liquid jetted under high pressure from an orifice and the target liquid refers to a liquid to which a jet is targeted in a vessel or piping.

According to the present invention, high-quality pulp with higher brightness can be obtained because stripped ink or the like are effectively removed by appropriately combining the step of generating cavitation and the subsequent step of removing ink comprising flotation and/or washing. Further benefits can be obtained by combining multiple ink stripping steps and ink removing steps with the present invention. Known or novel means for separating contaminants from fibers can be used as flotation and washing means.

According to the present invention, the flow rate of the jetting liquid increases and stronger cavitation occurs by increasing the discharge pressure of liquid. Moreover, the vessel receiving the target liquid is pressurized to increase the pressure in the region where cavitation bubbles collapse, resulting in an increase in the pressure difference between bubbles and the surroundings, whereby bubbles vigorously collapse with a stronger impact force. Cavitation is influenced by the amount of gas in liquid, and if the gas is excessive, bubbles collide with each other and join together to create a cushioning effect so that the impact force of collapse is absorbed by other bubbles and the impact force decreases. Thus, the treating temperature must be the melting point or more and the boiling point or less in view of the influence of dissolved gas and vapor pressure. In the case of aqueous liquids, high effects can be obtained preferably in the range of 0-80° C., more preferably 10° C.-60° C. Considering that the impact force is normally maximal at the midpoint between the melting point and the boiling point, optimal temperatures are around 50° C. in the case of aqueous solutions, though high effects can be obtained so far as the temperature is within the range described above because there is no influence of vapor pressure even at lower temperatures. Temperatures higher than 80° C. are unsuitable because the pressure resistance of the pressure vessel for generating cavitation significantly decreases and the vessel is liable to damage.

According to the present invention, the energy required for generating cavitation can be reduced by adding an agent capable of lowering the surface tension of liquid such as a surfactant. The agents to be added include, but are not limited to, known or novel surfactants, e.g., nonionic surfactants, anionic surfactants, cationic surfactants and ampholytic surfactants such as fatty acid salts, higher alkyl sulfates, alkyl benzene sulfonates, higher alcohols, alkyl phenols, alkylene oxide adducts of fatty acids or the like; and organic solvents, proteins, enzymes, natural polymers, synthetic polymers, etc. These may be added as single components or mixtures of two or more components. The amount to be added may be any amount necessary for lowering the surface tension of the jetting liquid and/or target liquid. The addition site may be anywhere in the process upstream of the site where cavitation is generated, and when a liquid is circulated, the addition site may be at or downstream of the site where cavitation is generated.

The recycled pulp produced through the process described above contains very little amounts of contaminants so that 100% of this pulp can be used to produce printing paper. The printing paper is made by a known paper machine under conditions not specifically defined. Coated paper obtained by the present invention contains small amounts of foreign substances on the paper surfaces and can be used to produce high-quality coated paper.

The method for jetting liquid may comprise jetting a high-speed fluid to the proximity of a material comprising pulp fibers when the material comprising pulp fibers is immersed in liquid, but preferably jetting it in such a manner that cavitation bubbles generated by a jet come into contact with the material comprising pulp fibers, most desirably they directly strike it. As used herein, the cavitation bubbles refer to fine bubbles generated by cavitation having a diameter of 1 µm-1 mm, preferably 0.1 mm-0.5 mm, more preferably 0.1 mm-0.2 mm.

If the material comprising pulp fibers is not immersed in liquid, a jet is most desirably emitted to directly strike it.

The whole material comprising pulp fibers may be fully immersed in water or only a part thereof may be immersed in water, and in either case, the target can be sequentially treated with a small jet by taking advantage of the drift of the material treated by the jet.

The material comprising pulp fibers may or may not be ground in advance. If it is ground as it is treated, grinding may be induced by cavitation or a jet or other means such as agitation.

When a slurry of the material comprising pulp fibers is a target to be treated, its consistency is not specifically defined, but desirably 30% by weight or less, more desirably 0.01% by weight (white water level)-20% by weight (high consistency pulp level).

Jetting for generating cavitation may take place in a vessel open to the atmosphere such as a pulper, but preferably within a pressure vessel for controlling cavitation.

The pressure of the jetting liquid (pressure upstream of the nozzle) is preferably as high as possible, but preferably 0.5 MPa or more and 30 MPa or less expressed as static pressure to use common pumps, especially 3 MPa or more and 10 MPa or less when influences on the pressure are taken into account. On the other hand, the pressure in the vessel (pressure downstream of the nozzle) is preferably 0.05 MPa or more and 0.3 MPa or less expressed as static pressure. The ratio between the pressure in the vessel and the pressure of the jetting liquid is preferably in the range of 0.001-0.5.

The jetting liquid to be emitted for generating cavitation is preferably water, but other reused water containing solutes or suspended substances may also be used, optionally containing surfactants or alkalis for aiding disintegration. Chemicals intentionally containing them may be used or liquids other than water may also be used as appropriate. An aqueous slurry containing pulp cellulose such as reused water, pulp drainage water, white water or pulp suspension recycled during the papermaking process may also be used.

The material from which pulp is derived is raw waste paper per se or a slurry-like material obtained by disintegrating raw waste paper, and gradually purified through the process into finished pulp. In the process, there is normally a flow rich in pulp fibers at a relatively high fiber solids content and a flow not rich in pulp fibers at a relatively low fiber solids content resulting from separation operations such as filtration. Cavitation treatment may be applied in any stage of the process, but desirably in a condition where much dirts exists without being stripped from pulp fibers or inorganic particles. As used herein, the inorganic particles refer to materials remaining as ash after incineration of paper, such as fillers internally added during papermaking or pigments used for coating. Examples include, but are not limited to, calcium carbonate, talc, kaolin, and titanium dioxide.

The material from which pulp is derived also contains newspapers or magazines per se and pulp or white water in the middle stage of purification produced by treating them in the process.

In the present invention, the nozzle used for generating cavitation may have a structure having a constriction in the direction perpendicular to the flow direction of the jetting fluid to induce sharp flow rate changes, or may have a sloped constriction such as a venturi tube. The former may be the nozzle of the cavitation washer for metals of Soyama et al. as described in J. Soc. Mat. Sci., Japan, vol. 47, No. 4, pp. 3 81-387, Apr. 1998, or a venturi tube as described in JPA SHO-54-125703 may also be used. The shape of the nozzle orifice is not specifically defined, and may be circular, polygonal or slit. Two or more nozzles may be placed.

Various nozzles are commercially available for generating a mist in a desired shape, and a preferred one can be selected from these nozzles and used so far as it has adequate pressure resistance. The nozzle may be a common nozzle from which a single fluid is emitted or a so-called multi-fluid nozzle having an outlet for mixing a jet with another fluid in the vicinity of or inside the jet.

The shape of the pressure vessel for controlling cavitation is not specifically defined, and it may have a special shape for forming a part of a flotator, cleaner, washer or the like or may have a special shape as described in JPA HEI-11-319819 and JPA 2000-563 for efficiently agitating the inside by means of the force of a jet and allowing the jet to act on a large area in the vessel.

A pressure is applied to upstream of the nozzle to provide a discharge pressure, and the discharge pressure (discharge velocity) is adjusted by regulating the fluid pressure upstream of the nozzle.

Cavitation is preferably controlled by regulating the pressure upstream of the orifice of the nozzle and the pressure after passing through the orifice. Pressure control before passing through the nozzle can be performed via a pressure control mechanism and pressure control after passing through the nozzle can be performed via a vessel having a pressure control mechanism.

The pressure control mechanism may be based on water column pressure or a combination of a pressure detection mechanism and an outlet flow rate control mechanism.

Cavitation occurs when multiple fluids having different speeds come into contact with each other, and the fluids entering and exiting the vessel include (1) a fluid staying in the vessel, (2) a fluid jetted from the nozzle, and (3) a fluid exiting the vessel and they may have different compositions. (1) may be intentionally changed via a liquid inlet other than the jetting nozzle of the vessel at a sufficiently low speed relative to (2) or may be simply replaced by (2). When three fluids (1)-(3) have the same composition and (1) is replaced by only (2), pulp successively passes through nozzle upstream→nozzle→nozzle downstream→vessel→vessel outlet.

The mechanism controlling the pressure in the vessel by discharging liquid from the vessel as appropriate may be an overflow outlet for discharging inflow while maintaining a constant water column pressure or a combination of a pressure detection mechanism and an outlet flow rate control mechanism.

When the fluids passing through the discharge mechanism have a single composition, pulp, dirts and water are discharged in a mixed state, but when the vessel has a separation mechanism, pulp, dirts and water may be separated in certain proportions and separately discharged from different outlets as different compositions.

The vessel of the equipment of the present invention can be provided with at least one fluid inlet other than the nozzle so that a fluid having a different composition from that of the target fluid can be used as a fluid to be jetted under high pressure for inducing cavitation.

The fluid inlet other than the nozzle is provided for this purpose, and a fluid having the same composition as that of the fluid supplied from the nozzle may be supplied from here, but a fluid having a different composition from that of the fluid supplied from the nozzle is preferably supplied from here, and more preferably, a low consistency fluid is jetted from the nozzle while a high consistency fluid is introduced from the fluid inlet other than the nozzle.

The fluids introduced from the nozzle and the fluid inlet other than the nozzle may be any fluid in the process or may be fresh water or the like introduced from the outside of the process.

A liquid channel for returning liquid to the vessel from downstream of the liquid channel connected to the liquid outlet of the vessel can be provided. The pulp discharged from the vessel can be filtered through a filter to give a high pulp consistency fluid and a low pulp consistency fluid. The pulp discharged from the vessel can also be separated by a centrifuge into a fluid having a high content of high gravity solids and a fluid having a low content of high gravity solids. Alternatively, the pulp discharged from the vessel can be separated by a screen into a fluid containing a large amount of ink lumps and a fluid containing a little amount of them, or the pulp discharged from the vessel can be separated by flotation treatment into a fluid containing a large amount of ink and a fluid containing a small amount of ink.

The separator of the pulp discharged from the vessel of the present invention can be any means suitable for the intended purpose, and may be a discrete member directly or indirectly connected to the cavitation jet system of the present invention or may be integrated as a part of the structure of a vessel forming the cavitation jet system.

The fluid to be returned into the vessel may contain dirts without problems, but desirably it contains less amounts of dirts than that contained in the fluid discharged from the vessel.

At least one inlet of the separating means may be connected to the outlet of the cavitation jet system and/or at least one outlet of the separating means may be connected to the inlet (including the nozzle) of the cavitation jet system. The separator may be integrated as a part of the structure of a vessel forming the cavitation jet system.

When high gravity dirts stripped by cavitation is to be removed, for example, the inlet of the separation mechanism is preferably connected to the outlet of the cavitation jet system or the separation mechanism is integrated by placing the nozzle at or near the inlet of the separation mechanism, and when high gravity dirt is to be removed in advance from the fluid jetted from the nozzle, for example, the outlet of the separation mechanism is preferably connected to the nozzle inlet of the cavitation jet system or the separation mechanism is integrated by placing the nozzle at or near the outlet of the separation mechanism.

The flotation tank of the present invention replaces the vessel of the present invention, and may be a sealed or closed type flotation tank having an inner pressure control mechanism or an open flotation tank capable of obtaining a suitable water column pressure at the bottom.

When the flotation tank is used, gas can be supplied to the flotation tank by means of spontaneous suction force by jet. When a high-speed fluid is jetted from the nozzle, another nozzle is placed in the jet flow to induce a force drawing the fluid toward the inner nozzle. This is suction based on the principle of venturi tube, whereby air is supplied to a low-pressure zone formed in the throat of the nozzle and emitted as fine bubbles from the nozzle to perform flotation.

In methods using jet in water, a liquid such as fresh water, industrial water, and reused water recycled in the papermaking process or drainage water containing pulp fibers can be jetted to the pulp suspension. The pulp suspension per se can also be jetted.

The energy required to generate cavitation bubbles can be reduced by adding a surfactant. By adding a surfactant, effective cavitation can be generated even if the nozzle downstream pressure is low.

In the treatment by cavitation of the present invention, the solids content of pulp cellulose in the vessel is desirably 0.01-20% by weight, preferably 0.1-3%, more preferably 0.1-1.5% by weight. Diffusion of bubbles is poor at consistencies of higher than 3% by weight and the volume treated increases to invite economical disadvantages at consistencies of less than 0.1% by weight.

Treatment by cavitation is desirably performed under basic conditions because cellulose fibers are highly swollen, stripped foreign substances are hardly redeposited and more OH active radicals are produced, but the treatment can also be performed under neutral regions to obtain advantages such as saving of chemicals or drainage load reduction by virtue of the strong stripping action by cavitation jet.

Pulp processing equipments using cavitation of the present invention are shown in FIGS. 8-11, for example.

In the figures, solid arrows indicate fluid flow.

Filled trapezoids represent nozzles from which a jet is emitted.

Solid lines issuing from the symbols representing pressure controllers show that the pressure controllers detect the pressure at the ends of the solid lines.

Dotted arrows issuing from the symbols representing pressure controllers show that the pressure controllers control the valves at the positions indicated by the arrows on the basis of pressure signals detected by the pressure controllers.

Serial numbers below the letters PC are the numbers of pressure controllers in each figure.

Figure 8:
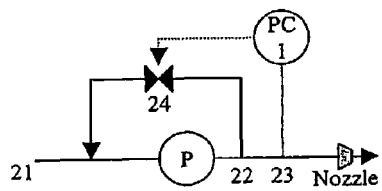
FIG. 8 is a schematic diagram comprising a pump, a nozzle and a pressure control mechanism of the present invention.

FIG. 8 is a schematic diagram comprising a pump and a nozzle and a pressure control mechanism of the present invention. A set of a pump, a nozzle and a pressure control mechanism can be used, or additionally multiple units of any one of these three elements can be used or multiple units of two or more of these three elements can be used or multiple such sets can be used. A raw material fed from 21 is supplied to the pump and pressurized in the pump and emitted from the nozzle.

A part of the fluid discharged from the pump can be returned to the pump inlet from 22 to control the pressure.

Pressure control is performed by a pressure controller, which senses the pressure at 23 and regulates the opening of valve 24 to adjust the amount of fluid returning to the pump inlet, thereby controlling the pressure at 23 constant.

Pressure control can be achieved by the automatic mechanism as shown or a manual method by e.g., manually regulating the valve depending on the pressure indication.

Normally, a tank is provided at 21 to prevent variation of the inlet pressure.

Figure 9:
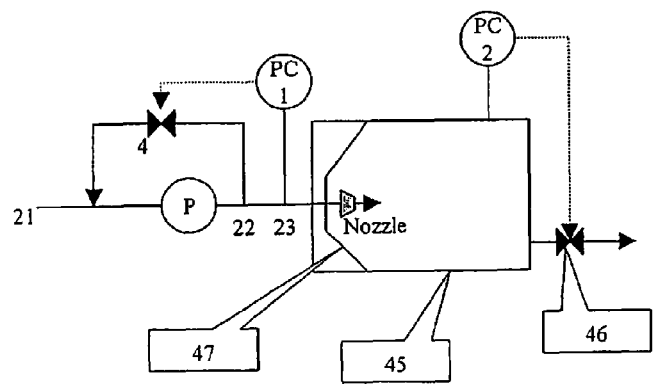
FIG. 9 is a schematic diagram showing a jet system of the present invention comprising a vessel and a pressure control mechanism in the vessel in addition to the system of FIG. 8 comprising a pump, a nozzle and a pressure control mechanism.

FIG. 9 shows a jet system of the present invention comprising a vessel and a pressure control mechanism in the vessel in addition to the system of FIG. 8 comprising a pump, a nozzle and a pressure control mechanism.

Multiple pumps, nozzles, pressure control mechanisms and vessels may be arranged in parallel.

Vessel 45 is a closed type vessel having a mechanism capable of controlling the pressure in the vessel (PC2). PC2 senses the pressure in the vessel and regulates the opening of vessel outlet valve 46, thereby adjusting the pressure in the vessel.

Pressure control can be achieved by the automatic mechanism as shown or a manual method by e.g., manually regulating the valve depending on the pressure indication or another method such as water column pressure.

A baffle plate as shown by 47 for regulating the flow from the nozzle to the vessel outlet as desired may be provided in the vessel, and the nozzle may be placed at any site within pressure-controlled vessel 45.

Figure 10:
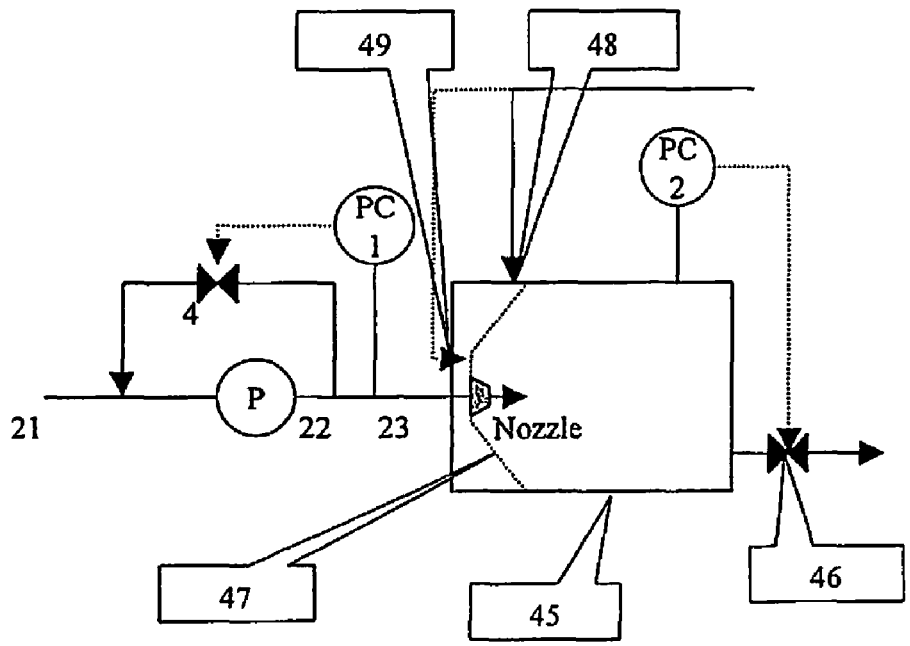
FIG. 10 is a schematic diagram showing a system comprising a pump, a nozzle and a pressure control mechanism as well as a vessel and a pressure control mechanism in the vessel as shown in FIG. 9 and further comprising a fluid inlet other than the nozzle, wherein the inner wall of the vessel is cone-shaped.
Figure 11:
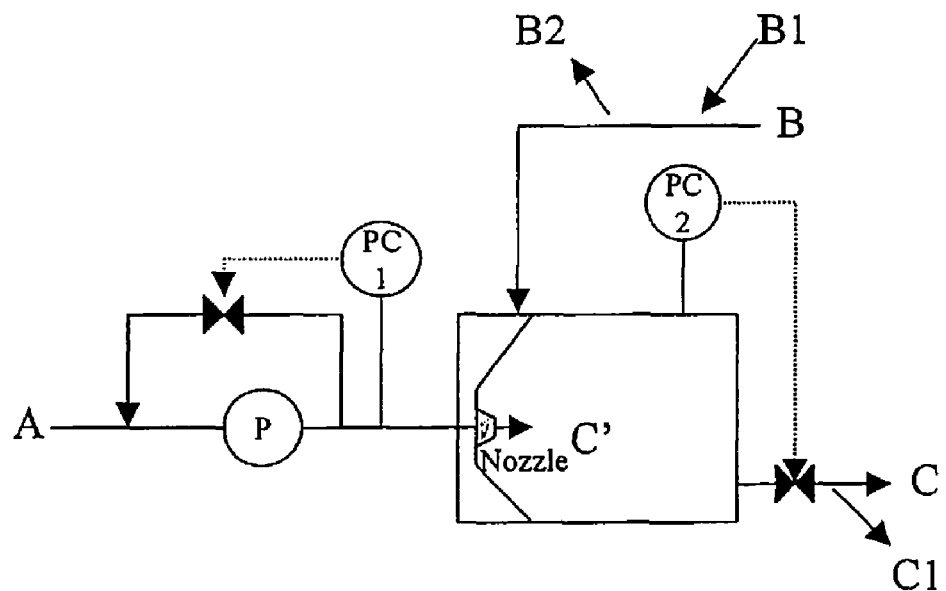
FIG. 11 is a schematic diagram showing a jet system of the present invention comprising a pump, a nozzle and a pressure control mechanism as well as a vessel and a pressure control mechanism in the vessel as shown in FIG. 9, and further comprising a fluid inlet other than the nozzle and a liquid channel for returning liquid to the vessel from downstream of the liquid channel connected to the liquid outlet of the vessel.
Figure 12:
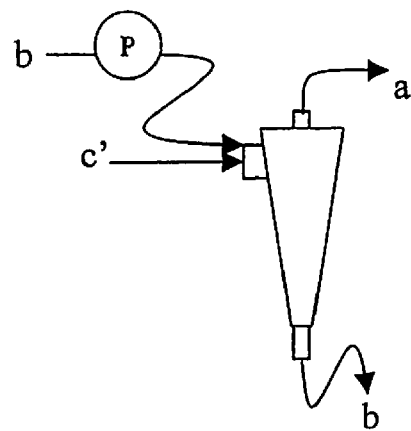
FIG. 12 is a schematic diagram showing a cleaner as a liquid separating means connected to downstream of the liquid channel connected to the liquid outlet of the vessel of the present invention or downstream thereof.
Figure 13:
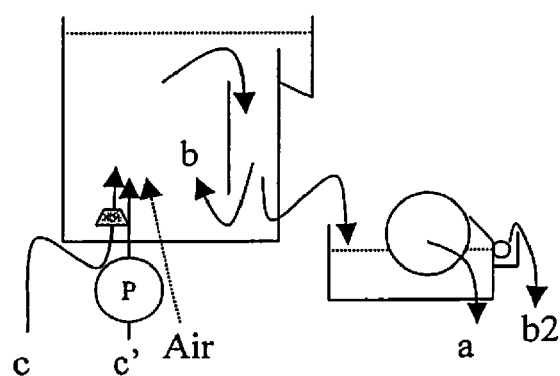
FIG. 13 is a schematic diagram showing a flotator as a liquid separating means connected to downstream of the liquid channel connected to the liquid outlet of the vessel of the present invention or downstream thereof.
Figure 14:
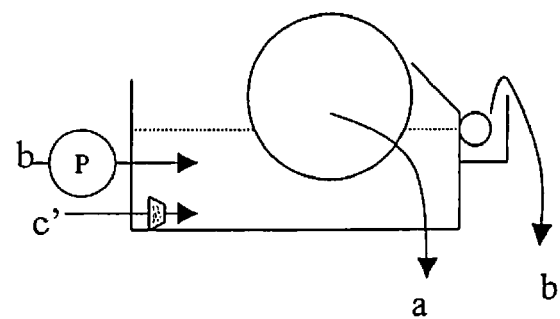
FIG. 14 is a schematic diagram showing a washer as a liquid separating means connected to downstream of the liquid channel connected to the liquid outlet of the vessel of the present invention or downstream thereof.

FIG. 10 shows a system comprising a pump, a nozzle and a pressure control mechanism as well as a vessel and a pressure control mechanism in the vessel, and further comprising a fluid inlet other than the nozzle. Multiple pumps, nozzles, pressure control mechanisms and vessels may be arranged in parallel. The fluid inlet 48 other than the nozzle may be placed at any site so far as it has the function of supplying fluid from the outside of the vessel into the vessel, and multiple fluid inlets may be provided in a single vessel as shown by 49.

Different fluids may be supplied to individual inlets.

EXAMPLES

The following examples illustrate the present invention more specifically without, however, limiting the invention thereto.

[Deinking Test 1]

Figure 6:
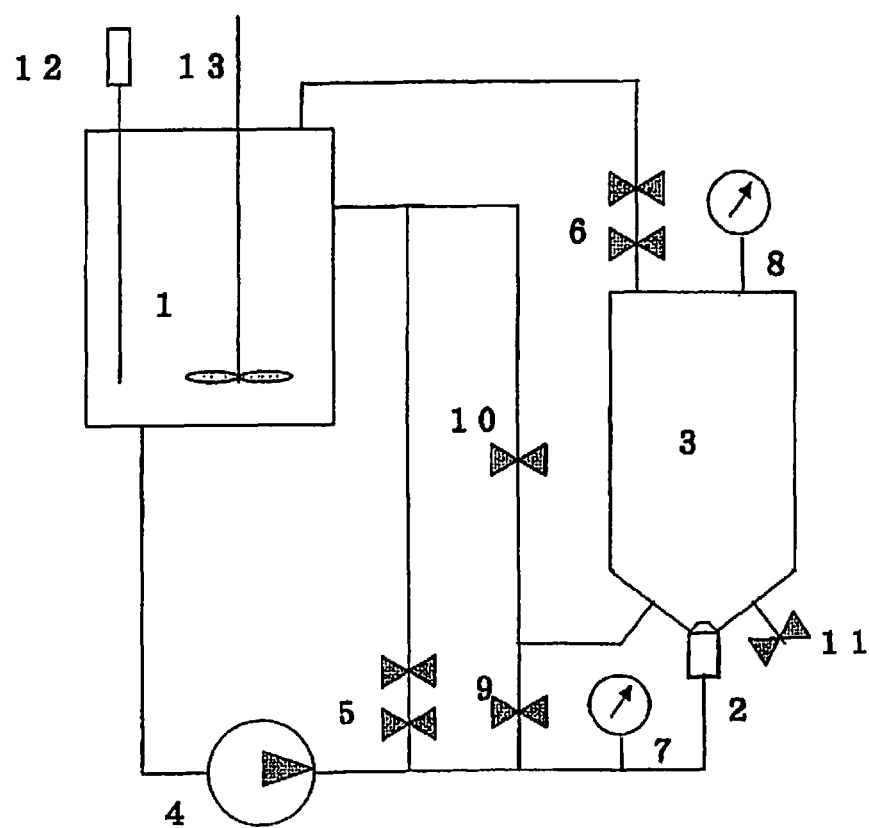
FIG. 6 shows an example of a cavitation jet washer used in a method of the present invention.

As a deinking test sample, degraded newspaper having passed 18 months or more after printing was chipped into 2 cm×2 cm. To 660 g in absolute dry weight of the waste paper was added 1.0% by weight of sodium hydroxide and the mixture was adjusted to a pulp consistency of 15% by weight with water and then disintegrated at 40° C. for 6 minutes using a pulper to produce disintegrated raw material A. The disintegrated sample was diluted with water to a waste paper concentration of 3% and adjusted to a desired concentration to produce a pulp suspension, which was then treated for a predetermined period by jetting about 1% by weight of the pulp suspension using the cavitation jet washer shown in FIG. 6. The resulting fraction was tested for Canadian Standard Freeness and the treated pulp was thoroughly washed on a 150-mesh wire. The washed pulp was produced into five 60 g/m$^2$ handsheets according to the Tappi standard method. The handsheets were tested for brightness and hue according to the method of JIS P-8148 using a colorimeter (Murakami Color Research Laboratory Co., Ltd.). Residual ink was also evaluated by determining fine grained ink as ERIC (effective residual ink concentration) value using a residual ink analyzer (Color Touch from Technidyne Corporation). Coarse grained ink was determined as unstripped ink area calculated from the average of dirts of 0.05 mm$^2$ or more on the five handsheets measured by image processing using a dirt analyzer (Spec Scan 2000 from Apogee Technology, Inc.). As comparative examples, raw material A was simultaneously diluted with water to 10% and beaten at a clearance of 0.2 mm for a given number of counts using a PFI mill. The beaten pulp was treated in the same manner as described above to produce handsheets, which were similarly tested for brightness and residual ink. The results of Examples 1-8 and Comparative examples 1-4 are shown in Table 1.

The cavitation jet washer is an adaptation of a cavitation jet washer previously described (Hitoshi Soyama, Ultrasonic Waves TECHNO, 2001 (11-12), 66) in the light of a summary of the structure thereof (Hitoshi Soyama, Turbomachinery, 29 (4), 1 (2001)). A jetting liquid is emitted via nozzle 2 to generate a cavitation jet. The nozzle diameter is 1.5 mm.

unstripped ink area decreased and brightness improved with the increase of upstream pressure. The freeness decreased but more gently as compared with Comparative examples 2-3 treated in a PFI mill. When comparing Examples 1-4 and Examples 5-8, deinking effects were better in Examples 1-4 using a greater difference between upstream pressure and downstream pressure.

[Deinking Test 2]

As a deinking test sample, a toner print bearing a photocopied standard pattern (GP605 from Canon Inc.) was chipped into 2 cm×2 cm. To 660 g in absolute dry weight of the waste paper was added 1.0% by weight of sodium hydroxide and the mixture was adjusted to a pulp consistency of 15% by weight with water and then disintegrated at 40° C. for 6 min using a pulper to produce disintegrated raw material B.

TABLE 1

|  |  | Upstream pressure MPa | Downstream pressure MPa | Number of counts in PFI mill | Freeness ml | ERIC value ppm | Unstripped ink area mm2/g | Brightness % | b value |
|---|---|---|---|---|---|---|---|---|---|
| Examples | 1 | 3 | 0.1 |  | 144 | 232 | 8.9 | 46.8 | 9.22 |
|  | 2 | 5 | 0.1 |  | 155 | 204 | 8.7 | 47.6 | 9.64 |
|  | 3 | 7 | 0.1 |  | 128 | 194 | 7.2 | 47.6 | 9.70 |
|  | 4 | 9 | 0.1 |  | 106 | 185 | 4.9 | 47.7 | 9.86 |
|  | 5 | 3 | 0.3 |  | 150 | 309 | 9.5 | 46.9 | 9.30 |
|  | 6 | 5 | 0.3 |  | 138 | 205 | 5.8 | 47.7 | 9.53 |
|  | 7 | 7 | 0.3 |  | 109 | 202 | 5.6 | 47.5 | 9.63 |
|  | 8 | 9 | 0.3 |  | 109 | 181 | 4.9 | 48.2 | 9.63 |
| Comparative examples | 1 |  |  | 0 | 197 | 345 | 23.0 | 44.8 | 8.30 |
|  | 2 |  |  | 3000 | 124 | 309 | 6.1 | 47.1 | 9.01 |
|  | 3 |  |  | 5000 | 85 | 308 | 3.7 | 47.3 | 9.58 |
|  | 4 |  |  | 7000 | 67 | 342 | 3.7 | 47.2 | 9.71 |

Examples 1-4

Raw material A was treated in the cavitation jet washer for 5 min at a pressure in the target vessel (downstream pressure) of 0.1 MPa and a jetting liquid pressure (upstream pressure) of 3 MPa (jet flow rate 46 m/sec), 5 MPa (jet flow rate 60 m/sec), 7 MPa (jet flow rate 70 m/sec) or 9 MPa (jet flow rate 78 m/sec). The treated samples were tested for freeness, ERIC value, unstripped ink area, brightness and b value following the methods described above.

Examples 5-8

Raw material A was treated in the cavitation jet washer for 5 min at a pressure in the target vessel (downstream pressure) of 0.3 MPa and a jetting liquid pressure (upstream pressure) of 3 MPa-9 MPa. The treated samples were tested for freeness, ERIC value, unstripped ink area, brightness and b value following the methods described above.

Comparative Example 1

Raw material A was diluted to 0.5% and tested for freeness, ERIC value, unstripped ink area, brightness and b value following the methods described above.

Comparative Examples 2-4

Raw material A was treated at a clearance of 0.2 mm for 3000-7000 counts using a PFI mill. The treated samples were tested for freeness, ERIC value, unstripped ink area, brightness and b value following the methods described above.

As shown in Table 1, the results of Examples 1-4 and Examples 5-8 demonstrate that the ERIC value and The disintegrated sample was diluted with water to a waste paper concentration of 3% and adjusted to a desired concentration, and then treated for a predetermined period using the cavitation jet washer used in deinking test 1. A part of the resulting pulp was thoroughly washed on a 150-mesh wire. The washed pulp was produced into five 60 g/m$^2$ handsheets according to the Tappi standard method. The remaining pulp was floated for 2 min using a box type flotator. The floated pulp was produced into five 60 g/m$^2$ handsheets according to the Tappi standard method. The residual toner on the handsheets was analyzed by an image analyzer (Spec Scan 2000 from Apogee Technology, Inc.) to determine the number of dirts as the average of visible dirt of 100 μm or more on a different set of five handsheets. Similarly, the average particle size of dirt was calculated.

Examples 9-10

Raw material B was treated in the cavitation jet washer for 5 min at a jetting liquid pressure (upstream pressure) of 8 MPa and a pressure in the target vessel (downstream pressure) of 0.2 MPa. The treated samples were tested for the number and the average particle size of dirt.

Comparative examples 5-8

As comparative examples, raw material B was treated in an ultrasonic washer for 5 min. The resulting pulp and crude pulp were treated as described above, and handsheets were produced from the pulp after washing and the pulp after flotation, and tested for the number of dirt.

The results of Examples 9-10 and Comparative examples 5-8 are shown in Table 2.

TABLE 2

|  |  | Bubble generating means | Flotation | Number of dirt/m² | Average particle size in μm |
|---|---|---|---|---|---|
| Examples | 9 | Cavitation | No | 155,000 | 139 |
|  | 10 | Cavitation | Yes | 8,100 | 111 |
| Comparative | 5 | Crude | No | 252,000 | 149 |
| examples | 6 | Crude | Yes | 38,600 | 140 |
|  | 7 | Ultrasonic | No | 199,000 | 133 |
|  | 8 | Ultrasonic | Yes | 24,000 | 125 |

As shown in Table 2, the effect of cavitation treatment on reducing the number of dirts in Examples 9-10 was clearly better than the effect of the treatment of Comparative examples 7-8 using an ultrasonic washer. Moreover, the number of dirts could be remarkably reduced by removing dirts by flotation after treatment.

[Deinking Test 3]

The exit material of the squeezer before the kneader in the field DIP process from factory A was subjected to cavitation treatment (upstream pressure 7 MPa, downstream pressure 0.3 MPa) in the cavitation jet washer used in deinking test 1 and compared with the exit material of the field kneader. Crude pulp (squeezer output), the pulp after cavitation treatment (cavitation) and the pulp after the field kneader were thoroughly washed on a 150-mesh wire, and then tested for fiber length and curl using FiberLab. Then, handsheets were produced and tested for the number of dirts of 0.05 mm² or more and ISO brightness.

Figure 7:
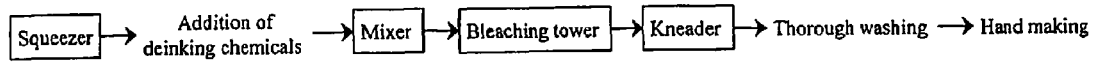
FIG. 7 shows flow charts of a field process and a process of examples to which deinking test 3 was applied.
Figure 7:
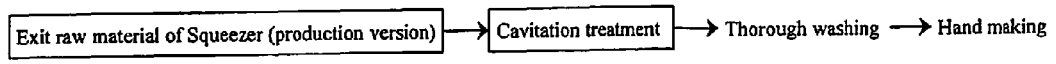

The flow charts of the field process and the process of examples to which deinking test 3 was applied are shown in FIG. 7. The results of Examples 11-13 and Comparative examples 9-10 are shown in Table 3.

thorough washing could be improved without adding deinking chemicals. In addition, fiber fragmentation and curl were less significant as compared with the sample treated in the field kneader at high consistency and high temperature with chemicals. Thus, high-quality pulp could be obtained with little damage to fibers.

[Deinking Test 4]

A printed paper glazed with a UV-curable coating was disintegrated using a high consistency pulper and the resulting pulp slurry was treated successively through a 10-cut flat screen and a 6-cut flat screen to remove undisintegrated fractions and rough coating fractions. The screened pulp was further loaded on a sieve tester and the pulp having passed through a 24-mesh sieve was collected. This sample was used as crude pulp and subjected to a cavitation jet treatment in the cavitation jet washer used in deinking test 1 or a treatment using a PFI mill to decrease the Canadian Standard Freeness of crude pulp by about 100 ml. The treated pulp was thoroughly washed on a 150-mesh wire to remove stripped/fragmented dirts, and then handsheets were produced. The treated pulp was further treated in a box type flotator (F/T) for 2 min, and then handsheets were produced. The numbers of large dirts of 0.1 mm² or more and 0.2 mm² or more in the produced handsheets were measured using an image analyzer and compared. The results of Example 14 and Comparative examples 11-13 are shown in Table 4.

TABLE 3

|  | Treatment | Deinking chemicals* | Consistency (%) | Temperature (° C.) | Number of dirts (dirts/m²) | ERIC value (ppm) | Brightness (%) | Fiber length (mm) | Curl (%) |
|---|---|---|---|---|---|---|---|---|---|
| Example 11 | 2 min | No | 1 | 40 | 500 | 34.6 | 80.7 | 0.90 | 14.9 |
| Example 12 | 5 min | No | 1 | 40 | 300 | 38.8 | 80.7 | 0.90 | 14.6 |
| Example 13 | 10 min | No | 1 | 40 | 280 | 37.5 | 80.6 | 0.89 | 14.0 |
| Comparative example 9 | Crude | No | 30 | 40 | 18,000 | 42.9 | 80.2 | 0.92 | 15.9 |
| Comparative example 10 | After kneader | Yes | 30 | 60 | 460 | 40.4 | 81.5 | 0.76 | 25.3 |

*The deinking chemicals include a deinking agent (whole weight 0.15% by weight of pulp), hydrogen peroxide (purity content 0.35% by weight of pulp), sodium hydroxide (purity content 0.3% by weight of pulp), and sodium silicate (whole weight 0.84% by weight of pulp).

As shown in Table 3, it is evident that coarse dirts can be remarkably reduced at low consistency and low temperature without adding deinking chemicals in Examples 11-13. Moreover, ink was well stripped so that the brightness after

TABLE 4

|  | Cavitation treatment time (min) | Number of counts | Freeness CSF (ml) | Number of dirts/m² after washing | | Number of dirts/m² after F/T | |
|---|---|---|---|---|---|---|---|
|  |  |  |  | >0.1 mm² | >0.2 mm² | >0.1 mm² | >0.2 mm² |
| Example 14 | 10 |  | 530 | 2,800 | 240 | 300 | 0 |
| Comparative example 11 |  | 0 | 620 | 10,000 | 5,000 |  |  |
| Comparative example 12 |  | 2,000 | 540 | 10,000 | 4,200 | 2,200 | 770 |
| Comparative example 13 |  | 3,000 | 510 | 12,000 | 3,800 | 1,200 | 360 |

As shown in Table 4, it is evident that the effect of cavitation treatment in Example 14 on reducing dirts, especially reducing the number of coarse dirts is much greater than the effect of the treatment of the comparative examples using a PFI mill. Moreover, coarse dirts could be remarkably reduced by removing dirts by flotation after treatment.

[Deinking Test 5]

Waste paper consisting of newspaper/magazine in a weight ratio of 70/30 was disintegrated in a high consistency pulper and dehydrated to a pulp consistency of 30% to produce crude pulp. This pulp was combined with 0.1%, 0.06% or 0% of a deinking agent on a solids basis and diluted and then subjected to cavitation treatment (upstream pressure 7 MPa, downstream pressure 0.3 MPa) in the cavitation jet washer used in deinking test 1. As a comparative example, the pulp was combined with 0.1% of the deinking agent and treated in a laboratory double-arm kneader. The pulp before and after treatment was thoroughly washed on a 150-mesh wire and then handsheets were produced and tested for the residual ink amount as ERIC value using Color Touch 2 (Technidyne Corporation) and also tested for ISO brightness. The influence on fiber damages was evaluated by testing fiber length and curl using FiberLab (Metso Automation, Inc.). The results of Examples 15-17 and Comparative examples 14-15 are shown in Table 5.

TABLE 5

|  | Treatment | Amount of deinking agent (%) | Freeness CSF (ml) | ERIC value (ppm) | Brightness (%) | Fiber analysis | |
| --- | --- | --- | --- | --- | --- | --- | --- |
|  |  |  |  |  |  | Fiber length (mm) | Curl (%) |
| Example 15 | Cavitation | 0.10 | 158 | 165 | 62.2 | 1.23 | 16.3 |
| Example 16 | Cavitation | 0.06 | 154 | 164 | 62.0 | 1.28 | 16.5 |
| Example 17 | Cavitation | 0 | 158 | 167 | 62.3 | 1.23 | 16.6 |
| Comparative example 14 | Crude | — | 265 | 230 | 59.9 | 1.17 | 19.2 |
| Comparative example 15 | Kneader | 0.10 | 193 | 180 | 60.0 | 1.02 | 18.2 |

As shown in Table 5, the ERIC value decreased by about 40% and the brightness after thorough washing increased by 2 points irrespective of the proportion of the deinking agent by subjecting crude pulp to cavitation treatment. The fiber length was approximately comparable and curl decreased as compared with the crude sample. However, the sample treated in a kneader did not improve in brightness and decreased fiber length though the ERIC value decreased. Thus, the ink stripping effect of the present invention was better than that of prior techniques because brightness can be improved with reduced fiber damages and without being influenced by deinking chemicals.

Example 18

Figure 15:
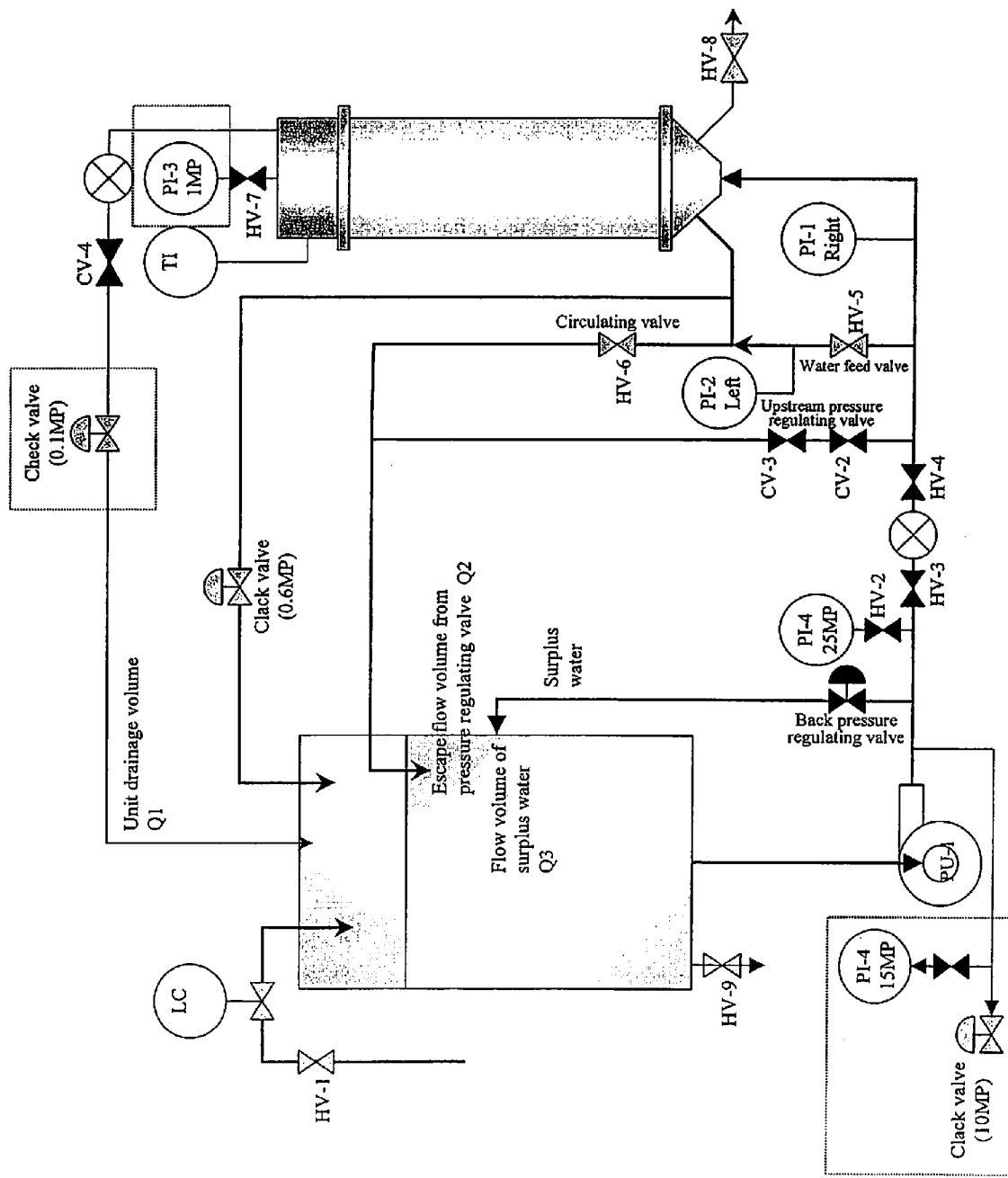
FIG. 15 is an example of a schematic diagram of a pulp processing equipment of the present invention.

Using the equipment shown in FIG. 15, an experiment was performed by regulating the inlet pressure (PI-1) of the reactor via a back pressure regulating valve and the outlet pressure (PI-3) via CV-4. PU-1 is a plunger-type metering pump so that the ratio between the self-circulating (surplus water) flow rate and the flow rate in the vessel varies by changing PI-1. For evaluation at the same process intensity, samples were taken at appropriate time intervals and evaluated for effect at the instant when a predetermined amount (40 liters) passed through the vessel.

The pulp slurry to be treated was produced from office waste paper (sorted office mixed waste paper containing about 25% of toner prints) to a consistency of 1%. Using a nozzle having an orifice of 0.15 mmφ, the equipment was operated with the inlet pressure set to 3 MPa by adjusting the back pressure regulating valve and the outlet pressure set to 0.1 MPa by adjusting CV-4.

Evaluation of effect was based on the reduction rate of dirts of 0.05 $mm^2$ or more counted by an image analyzer after thoroughly washing pulp before and after treatment on a 100-mesh wire. The reduction rate of dirts of 0.05 $mm^2$ or more was 71%.

Example 19

The equipment was operated under the same conditions as in Example 18 except that the inlet pressure was set to 7 MPa by adjusting the back pressure regulating valve and the outlet pressure was set to 0.05 MPa by adjusting CV-4. The reduction rate of dirts of 0.05 $mm^2$ or more was 69%.

Example 20

The equipment was operated under the same conditions as in Example 18 except that the inlet pressure was set to 7 MPa by adjusting the back pressure regulating valve and the outlet pressure was set to 0.3 MPa by adjusting CV-4. The reduction rate of dirts of 0.05 $mm^2$ or more was 79%.

Comparative Example 16

To confirm the influence of the passage through the pump and the back pressure regulating valve, the equipment was operated with the back pressure regulating valve fully open so that the discharged liquid wholly self-circulated as surplus water. The reduction rate of dirts of 0.05 $mm^2$ or more was 40%.

The invention claimed is:

1. A pulp processing equipment, comprising:
   a vessel having a form selected from the group consisting of closed, non-closed, batch and continuous type;
   one or more nozzles for emitting a pressurized jetting liquid to a material comprising pulp fibers present in the vessel;
   a pressure control mechanism located upstream of the one or more nozzles to control the discharge pressure of the one or more nozzles;
   a pump located upstream of the pressure control mechanism to apply a discharge pressure of 3 MPa or more on the one or more nozzles, the pressure being gauge pressure; and a separating means being any one of a flotator, a washer, a screen or a cleaner, the separating means being located downstream of the vessel,
wherein the vessel has a liquid inlet other than the one or more nozzles.

2. The pulp processing equipment of claim 1 wherein cavitation is generated by jetting liquid via the one or more nozzles.

3. The pulp processing equipment of claim 1 wherein the vessel is a closed type vessel capable of controlling pressure and has a mechanism controlling the pressure in the vessel while discharging liquid from the vessel as appropriate.

4. The pulp processing equipment of claim 1 characterized in that the inner wall of the vessel to which the one or more nozzles is fixed is cone-shaped, whereby the pulp suspension is homogeneously agitated by dynamic vortex.

5. The pulp processing equipment of claim 1, wherein the equipment has a liquid channel connected to a liquid outlet of the vessel wherein liquid is returned to the vessel from downstream of the liquid channel through the separating means.

6. The pulp processing equipment of claim 1, wherein the equipment has a two or more forked liquid channel connected to a liquid outlet wherein at least one of the forks is connected to the one or more nozzles in the vessel via the separating means so that liquid can be jetted into the vessel again.

7. The pulp processing equipment of claim 1, wherein the equipment has a mechanism for maintaining the liquid entering into the vessel and the liquid exiting from the vessel at the same amount to keep the level of liquid present in the vessel constant.

8. The pulp processing equipment of claim 1 characterized in that the vessel is any one of a flotator, washer, screen or cleaner.

9. The pulp processing equipment of claim 1 further comprising a baffle plate positioned in the vessel to regulate a flow from the one or more nozzles to a vessel outlet.

10. The pulp processing equipment of claim 1, further comprising a liquid channel connected to a liquid outlet of the vessel, wherein liquid is returned to the vessel.

11. The pulp processing equipment of claim 1, wherein the pressure control mechanism includes one or both of a pressure detection mechanism and an outlet flow rate control mechanism.

12. A pulp processing equipment, comprising:
a closed-type vessel capable of controlling pressure and having a mechanism controlling the pressure in the vessel while discharging liquid from the vessel as appropriate;
one or more nozzles for emitting a pressurized jetting liquid to a material comprising pulp fibers present in the vessel;
a pressure control mechanism located upstream of one or more nozzles to control the discharge
pressure of the one or more nozzles; and
a pump located upstream of the pressure control mechanism to apply a discharge pressure of 3 MPa or more on the one or more nozzles, the pressure being gauge pressure;
wherein the vessel has a liquid inlet other than the one or more nozzles and the equipment has a
channel connected to a liquid outlet of the vessel and wherein liquid is returned to the vessel from downstream of the liquid channel through a separating means, being any one of a flotator, a washer, a screen or a cleaner.

13. A pulp processing equipment, comprising:
a vessel having a form selected from the group consisting of closed, non-closed, batch and continuous type;
one or more nozzles for emitting a pressurized jetting liquid to a material comprising pulp fibers present in the vessel;
a pressure control mechanism located upstream of the one or more nozzles to control the discharge
pressure of the one or more nozzles; and
a pump located upstream of the pressure control mechanism to apply a discharge pressure of 3 MPa or more on the one or more nozzles, the pressure being gauge pressure, wherein the vessel has a liquid inlet other than one or more nozzles and the vessel is any one of
a flotator, washer, screen or cleaner.

* * * * *